US009292850B2

(12) United States Patent
Patterson (10) Patent No.: US 9,292,850 B2
(45) Date of Patent: Mar. 22, 2016

(54) HOST CAPTURE

(75) Inventor: Barbara Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 743 days.

(21) Appl. No.: 12/205,112

(22) Filed: Sep. 5, 2008

(65) Prior Publication Data

US 2009/0070171 A1    Mar. 12, 2009

Related U.S. Application Data

(60) Provisional application No. 60/971,134, filed on Sep. 10, 2007.

(51) Int. Cl.
*G06Q 20/40* (2012.01)
*G06Q 20/10* (2012.01)
*G06Q 20/38* (2012.01)
*G06Q 30/06* (2012.01)
*G06Q 40/00* (2012.01)

(52) U.S. Cl.
CPC ............ *G06Q 20/40* (2013.01); *G06Q 20/108* (2013.01); *G06Q 20/385* (2013.01); *G06Q 20/401* (2013.01); *G06Q 30/06* (2013.01); *G06Q 40/00* (2013.01)

(58) Field of Classification Search
CPC ..................................................... G06Q 20/40
See application file for complete search history.

(56) References Cited

U.S. PATENT DOCUMENTS

| 5,465,206 | A | | 11/1995 | Hilt et al. |
| 5,477,038 | A | | 12/1995 | Levine et al. |
| 5,500,513 | A | | 3/1996 | Langhans et al. |
| 5,621,201 | A | | 4/1997 | Langhans et al. |
| 5,991,738 | A | * | 11/1999 | Ogram ............... G06Q 20/4012 235/375 |
| 6,226,624 | B1 | | 5/2001 | Watson et al. |
| 6,247,129 | B1 | | 6/2001 | Keathley et al. |
| 6,535,726 | B1 | * | 3/2003 | Johnson ...................... 455/406 |
| 6,535,880 | B1 | * | 3/2003 | Musgrove et al. ......... 705/26.43 |
| 6,560,581 | B1 | | 5/2003 | Fox et al. |
| 6,837,425 | B2 | | 1/2005 | Gauthier et al. |
| 6,868,391 | B1 | * | 3/2005 | Hultgren ....................... 705/26 |
| 6,920,611 | B1 | | 7/2005 | Spaeth et al. |
| 7,007,840 | B2 | | 3/2006 | Davis |
| 7,039,611 | B2 | | 5/2006 | Devine |
| 7,051,923 | B2 | | 5/2006 | Nguyen et al. |
| 7,104,446 | B2 | | 9/2006 | Bortolin et al. |

(Continued)

FOREIGN PATENT DOCUMENTS

| KR | 1998-072136 A | 10/1998 |
| KR | 10-0299010 | 10/2001 |

(Continued)

OTHER PUBLICATIONS

Search/Examination Report dated Nov. 26, 2009 from International Application No. PCT/US2008/075694, 13 pages.

(Continued)

*Primary Examiner* — Jacob C. Coppola
(74) *Attorney, Agent, or Firm* — Kilpatrick Townsend & Stockton LLP (57) ABSTRACT

A system and method for processing transactions. A unique transaction identifier is generated for each transaction. Processing of the transaction utilizes the unique transaction identifier.

22 Claims, 6 Drawing Sheets

(56) References Cited

U.S. PATENT DOCUMENTS

| | | |
|---|---|---|
| 7,121,456 B2 | 10/2006 | Spaeth et al. |
| 7,124,937 B2 | 10/2006 | Myers et al. |
| 7,152,780 B2 | 12/2006 | Gauthier et al. |
| 7,243,853 B1 | 7/2007 | Levy et al. |
| 7,280,981 B2 | 10/2007 | Huang et al. |
| 7,350,702 B2 | 4/2008 | Bortolin et al. |
| 7,356,516 B2 | 4/2008 | Richey et al. |
| D568,388 S | 5/2008 | Hammad |
| D568,389 S | 5/2008 | Hammad |
| D568,390 S | 5/2008 | Law et al. |
| D569,424 S | 5/2008 | Law et al. |
| D569,425 S | 5/2008 | Law et al. |
| 7,367,501 B2 | 5/2008 | Bortolin et al. |
| D571,399 S | 6/2008 | Hammad et al. |
| D571,855 S | 6/2008 | Law et al. |
| D571,856 S | 6/2008 | Hammad et al. |
| 7,389,275 B2 | 6/2008 | Kemper et al. |
| D572,752 S | 7/2008 | Hammad |
| D573,181 S | 7/2008 | Hammad |
| D575,815 S | 8/2008 | Hammad et al. |
| D575,816 S | 8/2008 | Law et al. |
| 7,407,094 B2 | 8/2008 | Myers et al. |
| D576,207 S | 9/2008 | Hammad et al. |
| 7,427,021 B2 | 9/2008 | Kemper et al. |
| D578,158 S | 10/2008 | Hammad et al. |
| D580,974 S | 11/2008 | Hammad |
| 7,464,870 B2 | 12/2008 | Nguyen et al. |
| D584,769 S | 1/2009 | Hammad |
| 7,482,925 B2 | 1/2009 | Hammad et al. |
| D590,875 S | 4/2009 | Law et al. |
| 7,522,905 B2 | 4/2009 | Hammad et al. |
| D592,244 S | 5/2009 | Hammad |
| D593,151 S | 5/2009 | Hammad |
| D593,152 S | 5/2009 | Hammad et al. |
| 7,527,208 B2 | 5/2009 | Hammad et al. |
| 7,567,920 B2 | 7/2009 | Hammad et al. |
| 7,571,141 B2 | 8/2009 | Huang et al. |
| 7,591,412 B2 | 9/2009 | Spaeth et al. |
| 7,600,670 B2 | 10/2009 | Gauthier et al. |
| 7,611,054 B2 | 11/2009 | Bortolin et al. |
| 7,624,917 B2 | 12/2009 | Spaeth et al. |
| 7,627,522 B2 | 12/2009 | Monk |
| 7,653,602 B2 | 1/2010 | Davis |
| 7,654,451 B2 | 2/2010 | Bortolin et al. |
| 7,657,441 B2 | 2/2010 | Richey et al. |
| 7,668,785 B1 | 2/2010 | Hammad |
| 7,690,560 B2 | 4/2010 | Gauthier et al. |
| 7,694,287 B2 | 4/2010 | Singh et al. |
| 7,702,916 B2 | 4/2010 | Seaton, Jr. et al. |
| 7,711,621 B2 | 5/2010 | Huang et al. |
| 7,711,639 B2 | 5/2010 | Reid et al. |
| 7,725,369 B2 | 5/2010 | Shiftan et al. |
| 7,725,394 B2 | 5/2010 | Lal et al. |
| 7,726,561 B2 * | 6/2010 | Katyal et al. ................. 235/380 |
| 7,739,169 B2 | 6/2010 | Hammad |
| 7,740,168 B2 | 6/2010 | Hammad et al. |
| 7,742,986 B2 | 6/2010 | Steele et al. |
| 7,769,599 B2 | 8/2010 | Yanak et al. |
| 7,774,402 B2 | 8/2010 | Singh et al. |
| 7,783,564 B2 | 8/2010 | Mullen et al. |
| 7,792,688 B2 | 9/2010 | Yanak et al. |
| 7,793,837 B1 | 9/2010 | Faith et al. |
| 7,809,637 B2 | 10/2010 | Monk |
| 7,809,650 B2 | 10/2010 | Bruesewitz et al. |
| 7,810,165 B2 | 10/2010 | Hammad et al. |
| 7,818,264 B2 | 10/2010 | Hammad |
| 7,819,322 B2 | 10/2010 | Hammad et al. |
| 7,822,679 B1 | 10/2010 | Vaux et al. |
| 7,827,077 B2 | 11/2010 | Shiftan et al. |
| 7,840,459 B1 | 11/2010 | Loftesness et al. |
| 2001/0044787 A1 * | 11/2001 | Shwartz et al. ................. 705/78 |
| 2002/0046092 A1 * | 4/2002 | Ostroff ............................. 705/14 |
| 2002/0087344 A1 | 7/2002 | Billings et al. |
| 2002/0111919 A1 * | 8/2002 | Weller et al. ..................... 705/67 |
| 2002/0120582 A1 | 8/2002 | Elston et al. |
| 2002/0123972 A1 * | 9/2002 | Hodgson et al. ................. 705/72 |
| 2002/0138445 A1 * | 9/2002 | Laage et al. ..................... 705/67 |
| 2002/0152180 A1 * | 10/2002 | Turgeon ............. G06Q 20/4012 705/72 |
| 2003/0023524 A1 * | 1/2003 | Sugimoto et al. ................ 705/34 |
| 2003/0093368 A1 * | 5/2003 | Manfre et al. ................... 705/39 |
| 2003/0200184 A1 | 10/2003 | Dominguez et al. |
| 2004/0117300 A1 * | 6/2004 | Jones et al. ..................... 705/39 |
| 2004/0148255 A1 * | 7/2004 | Beck et al. ...................... 705/39 |
| 2004/0153650 A1 * | 8/2004 | Hillmer ........................ 713/176 |
| 2004/0230525 A1 * | 11/2004 | Barsade et al. ................. 705/40 |
| 2004/0243517 A1 * | 12/2004 | Hansen ......................... 705/64 |
| 2005/0033686 A1 * | 2/2005 | Peart et al. ...................... 705/39 |
| 2005/0119972 A1 | 6/2005 | Inglis |
| 2005/0131826 A1 * | 6/2005 | Cook ............................... 705/44 |
| 2005/0240531 A1 * | 10/2005 | Wolff .............................. 705/53 |
| 2006/0149603 A1 * | 7/2006 | Patterson et al. ................ 705/4 |
| 2006/0253390 A1 * | 11/2006 | McCarthy et al. .............. 705/39 |
| 2007/0055597 A1 * | 3/2007 | Patel et al. ..................... 705/35 |
| 2007/0055630 A1 * | 3/2007 | Gauthier et al. ................ 705/44 |
| 2008/0021821 A1 * | 1/2008 | Katyal et al. .................... 705/40 |
| 2008/0052182 A1 | 2/2008 | Marshall |
| 2008/0059306 A1 * | 3/2008 | Fordyce et al. ................. 705/14 |
| 2008/0086420 A1 * | 4/2008 | Gilder et al. .................... 705/44 |
| 2008/0133350 A1 | 6/2008 | White et al. |
| 2008/0179395 A1 * | 7/2008 | Dixon et al. .................. 235/380 |
| 2008/0249937 A1 * | 10/2008 | Walls et al. ..................... 705/43 |
| 2008/0275771 A1 * | 11/2008 | Levine ............................ 705/14 |
| 2008/0300973 A1 | 12/2008 | DeWitt et al. |
| 2009/0006203 A1 * | 1/2009 | Fordyce et al. ................. 705/14 |
| 2009/0070171 A1 * | 3/2009 | Patterson ......................... 705/7 |
| 2009/0076938 A1 | 3/2009 | Patterson |
| 2009/0112757 A1 | 4/2009 | Hammad et al. |
| 2009/0182654 A1 | 7/2009 | Mullen et al. |
| 2010/0030688 A1 * | 2/2010 | Patterson ........................ 705/44 |
| 2010/0169170 A1 | 7/2010 | Fordyce et al. |

FOREIGN PATENT DOCUMENTS

| | | |
|---|---|---|
| KR | 10-2001-0094823 | 11/2001 |
| KR | 2002-0013621 A | 2/2002 |
| KR | 10-2004-0002035 | 1/2004 |
| WO | 2005/006155 A2 | 1/2005 |
| WO | 2005/111957 A1 | 11/2005 |

OTHER PUBLICATIONS

Supplementary European Search Report mailed May 29, 2012 in European Application No. 08831113.9, 8 pages.

Office Action of Jan. 6, 2011 in related U.S. Appl. No. 12/182,032.

* cited by examiner

HOST CAPTURE

CROSS-REFERENCES TO RELATED APPLICATIONS

This patent application is a non-provisional of and claims priority to U.S. provisional patent application No. 60/971,134, filed on Sep. 10, 2007, which is herein incorporated by reference in its entirety for all purposes.

BACKGROUND

News accounts have reported on data thefts at large retail stores. Many such stores retain credit card information as data stored on a computer network long after purchases have been consummated. Such information is then relatively unsecure, as many retail stores do not take sufficiently effective network security precautions. According to news reports, thieves broke into retailers' computer networks and download millions of credit card numbers to the thieves' own system. The thieves are alleged to have accessed the computer networks by breaking encryption protecting wireless access points to the stores' networks. Once they were able to log onto the computers on the stores' networks through the compromised wireless access points, they could take information relating to credit card transactions conducted by those stores within the previous few years. This information included credit card numbers, security codes, expiration dates, and other pertinent data.

Once stolen, credit card information may be sold on the black market, and may used to conduct fraudulent transactions along with identity fraud. Improvements to credit card transactions, to deter such data theft, would be desirable.

Embodiments of the invention address these and other problems, individually and collectively.

BRIEF SUMMARY

Embodiments of the invention include associating unique transaction identifiers with transactions, and using the unique transaction identifiers for processing. If the unique transaction identifier is stolen, account numbers for consumers are not compromised.

One embodiment of the invention is directed towards a method for processing a transaction, comprising receiving an authorization request message comprising an account number; associating a unique transaction identifier with the transaction, after receiving the authorization request message; identifying an issuer identifier from the account number; sending the authorization request message to an issuer using the issuer identifier; receiving an authorization response message from the issuer; and sending the authorization response message and the unique transaction identifier.

Another embodiment of the invention is directed towards a method for processing a transaction, comprising receiving a preauthorization request message comprising an account number; associating a unique transaction identifier with the transaction, after receiving the preauthorization request message; identifying an issuer identifier from the account number; sending the authorization request message to an issuer using the issuer identifier; receiving an authorization response message from the issuer; sending the authorization response message and the unique transaction identifier; and receiving a transaction completion message comprising the unique transaction identifier and a revised transaction amount.

Another embodiment of the invention is directed towards a method for processing a transaction, comprising obtaining an account number associated with a consumer; sending an authorization request message comprising the account number and an amount for the transaction to a payment processing network; and receiving an authorization response message comprising a unique transaction identifier for the transaction.

Another embodiment of the invention is directed towards a method for processing a transaction, comprising obtaining an account number associated with a consumer; sending a preauthorization request message comprising the account number to a payment processing network; receiving an authorization response message comprising a unique transaction identifier for the transaction; and sending a payment completion message comprising the unique transaction number and a revised transaction amount to the payment processing network.

Another embodiment of the invention is directed towards a computer readable medium comprising code for receiving, an authorization request message comprising an account number; code for associating a unique transaction identifier with the transaction; code for identifying an issuer identifier from the account number; code for sending the authorization request message to an issuer using the issuer identifier; code for receiving an authorization response message from the issuer; code for sending the authorization response message and the unique transaction identifier; and code for upon receiving an authorization response message comprising an approval of the transaction.

Another embodiment of the invention is directed towards a computer readable medium comprising code for receiving a preauthorization request message comprising an account number and an estimated transaction amount; code for associating a unique transaction identifier with the transaction; code for identifying an issuer identifier from the account number; code for sending the authorization request message to an issuer using the issuer identifier; code for receiving an authorization response message from the issuer; code for sending the authorization response message and the unique transaction identifier; and code for receiving a transaction completion message from the merchant comprising the unique transaction identifier and a revised transaction amount.

Another embodiment or aspect of the invention is directed towards a computer-implemented method of operating a payment processing network to process a transaction between an issuer and a remote party, the method comprising of receiving an authorization request message comprising an account number from the remote party, associating a unique transaction identifier with the transaction, after receiving the authorization request message, identifying an issuer identifier from the account number, sending the authorization request message to an issuer using the issuer identifier, receiving an authorization response message from the issuer; and sending the authorization response message and the unique transaction identifier to the remote party.

Another embodiment or aspect of the invention is directed towards a computer-implemented method of operating payment processing network to process a transaction between an issuer and a remote party, the method comprising of receiving a preauthorization request message comprising an account number, associating a unique transaction identifier with the transaction, after receiving the preauthorization request message, identifying an issuer identifier from the account number, sending the preauthorization request message to an issuer using the issuer identifier, receiving an authorization response message from the issuer, sending the authorization response message and the unique transaction identifier to the remote party, and receiving from the remote party a transaction completion message comprising the unique transaction identifier and a revised transaction amount.

By virtue in particular of the steps in embodiments of associating a unique transaction identifier with a transaction at the payment processing network and sending the authorization response message and the unique transaction identifier to the remote party, these aspects of the invention can allow the remote party to identify the transaction (for instance allowing its details to be accessed later if required) without requiring the remote party to store the account number. Thus, these aspects of the invention can provide considerably improved protection of sensitive data through technical features without requiring additional network security.

Another embodiment or aspect of the invention is directed towards a computer-implemented method of operating merchant or acquirer apparatus to process a transaction, the method comprising of obtaining an account number associated with a consumer, sending an authorization request message comprising the account number and an amount for the transaction to a remote payment processing network, receiving from the remote payment processing network an authorization response message comprising a unique transaction identifier for the transaction, and purging records of the account number.

Another embodiment or aspect of the invention is directed towards a computer-implemented method of operating merchant or acquirer apparatus to process a transaction, the method comprising of obtaining an account number associated with a consumer, sending a preauthorization request message comprising the account number to a remote payment processing network, receiving an authorization response message comprising a unique transaction identifier for the transaction, purging records of the account number, and sending a payment completion message comprising the unique transaction number and a revised transaction amount to the payment processing network.

By virtue in particular of the steps in embodiments of sending a request message comprising the account number from the merchant or acquirer apparatus to a remote payment processing network, receiving from the remote payment processing network an authorization response message comprising a unique transaction identifier for the transaction, and purging records of the account number, these aspects of the invention can avoid the storing of account numbers at the merchant or acquirer apparatus whilst still allowing the transaction to be identified (for instance allowing its details to be accessed later if required). Thus, these aspects of the invention can provide considerably improved protection of sensitive data through technical features without requiring additional network security.

These and other embodiments of the invention are described in further detail below.

BRIEF DESCRIPTION OF THE DRAWINGS

FIGS. 5(*a*)-5(*b*) show block diagrams of portable consumer devices.

DETAILED DESCRIPTION

Embodiments of the invention can be used in a transaction environment encompassing multiple types of transactions. In a first embodiment of a transaction type, a payment transaction is conducted, but the final transaction amount is not known at the start of the transaction. In a second embodiment of a transaction type, the final amount is known at the start of the transaction.

In certain embodiments, a transaction occurs such that the final amount of the transaction is not known at first. This can be for transactions such as at a restaurant, where the credit card payment is authorized before the final amount (which includes a tip) is known, at a gas (petrol) station, where the transaction is authorized before the total bill (which depends on the amount of fuel pumped) is known, and so on.

In this embodiment, the merchant conducting the transaction can first take the payment information proffered by the consumer, such as information from a credit card. The credit card can be issued to the consumer by an issuer such as a bank. The merchant can send an authorization request message to the issuer requesting authorization to conduct the transaction. As the total amount of the transaction is not known at this time, the issuer may authorize the transaction only if the credit card has a certain amount of credit remaining. For example, in a car fuel purchase transaction, the merchant (i.e., the gas station) may send an authorization request message to the issuer with no amount specified, or an estimated amount. In some implementations, such as for fuel purchases, the issuer can require that the account associated with the credit card have at least a predetermined amount of funds or credit (such as $100) remaining in the account before the transaction is authorized. The issuer can check the account to determine the balance left, and if there is at least the required $100, it can send an authorization response message back to the merchant.

In this embodiment, the authorization request message can also contain a unique transaction identifier. This identifier can be used to identify the specific transaction, even after the transaction has been completed. Such an identifier removes the need to refer to the credit card number, as further detailed below. Once the merchant receives the authorization response message, the transaction can continue until completion. In the car fuel purchase, this entails having the consumer's automobile receive the desired amount of fuel. Then, when the fuel has been dispensed, the total cost of the transaction should be known. At this point the merchant can send a completion message to the issuer, stating that the transaction (by referring to the unique transaction identifier) has completed and including both the final transaction amount and the unique transaction identifier. Once completed, funds representing the final transaction amount can be transferred between the parties. In certain implementations, this transfer occurs in substantially real time once the merchant indicates completion.

In a second exemplary embodiment, a transaction occurs such that the final amount of the transaction is known at first. It is similar to the first transaction type, except that the authorization request message initially sent by the merchant can contain the final transaction amount. This can be for transactions such as at a retail store or for purchases over the Internet. In these situations, the merchant conducting the transaction may first take the payment information offered by the consumer, such as information from a credit card. The merchant can then send an authorization request message to the issuer requesting authorization to conduct the transaction. This message can include the final transaction amount. The issuer can check the consumer's account to determine the balance left, and if there is at least the required amount to pay for the transaction, it can send an authorization response message back to the merchant. As in the first embodiment, this authorization message may also include a unique transaction identifier. When the merchant receives the authorization message, the transaction can be completed. Once completed, funds representing the final transaction amount can be transferred between the parties. In certain implementations, this transfer occurs in substantially real time with the authorization.

For both the first and second transaction types, the process of the issuer authorizing the transaction is called "authorization". The authorization step alerts the merchant and the consumer that the transaction can go ahead. Payment generally occurs after the authorization step takes place. Payment occurs when funds transfer from the issuer to the merchant, or to a bank or other institution affiliated with the merchant. This payment step can be referred to as the "clearing and settlement" step. Often, clearing and settlement takes place hours or even days later. However, in certain embodiments, clearing and settlement can occur in "substantially real time". Substantially real time, in these embodiments, can constitute an amount of time on the order of several minutes, up to several hours. In certain embodiments, substantially real time comprises 30 minutes. In such embodiments, clearing and settlement can take place within 30 minutes of the final amount of the transaction being determined and transmitted to the issuer. In other embodiments, substantially real time comprises several days, such as 8 days, which can be for ecommerce and other transactions.

Specific embodiments of the invention can be described with reference to FIGS. 1-6.

I. Exemplary Systems

Figure 1:
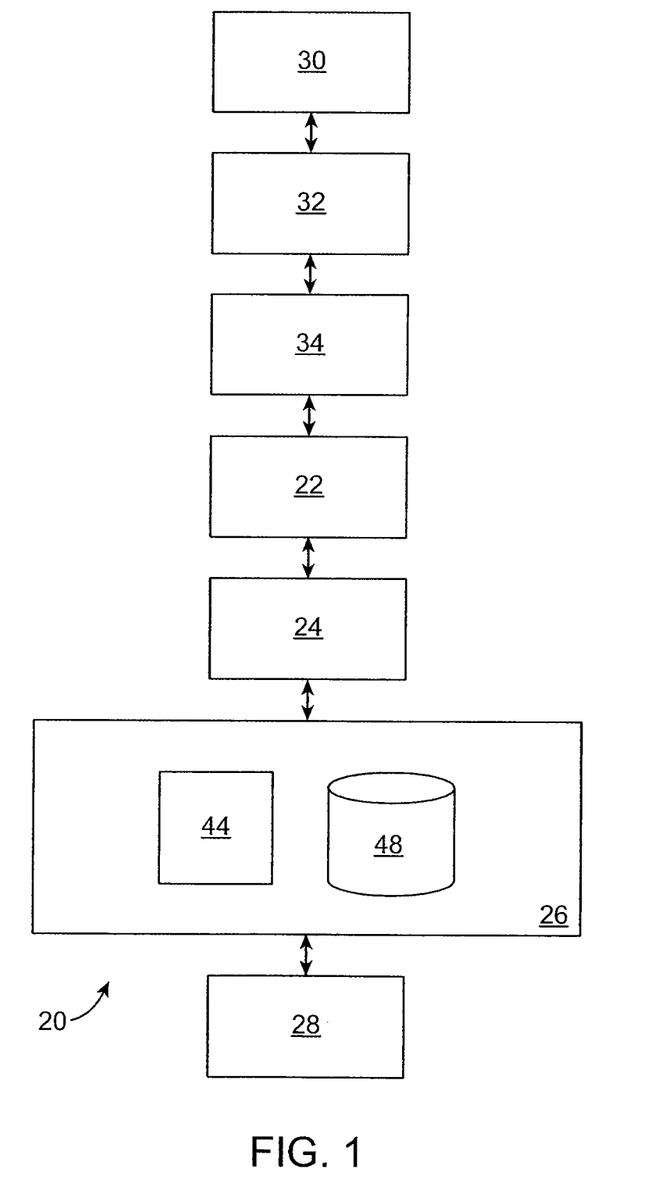
FIG. 1 is a block diagram of a system according to an embodiment of the invention.

FIG. 1 shows a system 20 according to an embodiment of the invention. Other systems according to embodiments of the invention may include fewer or more components than are specifically shown in FIG. 1.

FIG. 1 shows a consumer 30, a portable consumer device 32, an access device 34, a merchant 22, an acquirer 24, a payment processing network 26, and an issuer 28, in operative communication with each other. The acquirer 24 and issuer 28 can communicate through the payment processing network 26. As described above, an "issuer" is typically a business entity (e.g., a bank) which maintains financial accounts for the consumer and often issues a portable consumer device such as a credit or debit card to the consumer. A "merchant" is typically an entity that engages in transactions, such as a store, person, or service provider. In a typical payment transaction, a consumer 30 may purchase goods or services at the merchant 22 using a portable consumer device 32. The access device 34 can read the payment data from the portable consumer device 32, and provide that data to the merchant 22. The acquirer 24 of the merchant 22 can contact the issuer 42 associated with the payment account through the payment processing network 40, to receive either an authorization or a denial for the transaction.

As used herein, an "acquirer" is typically a business entity, e.g., a commercial bank that has a business relationship with a particular merchant or other entity. Some entities can perform both issuer and acquirer functions. Embodiments of the invention encompass such single entity issuer-acquirers.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 26 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server. The server computer may comprise a computer readable medium comprising code for processing transactions as detailed below, including code for receiving messages from merchants, acquirers, and issuers, code for generating unique transaction identifiers and associating them with specific transactions, code for sending messages, code for identifying issuers, and code for clearing and settling transactions and chargeback requests in substantially real time.

The server computer 44 may also comprise a computer readable medium comprising: code for receiving, from a merchant, an authorization request message comprising an account number; code for associating a unique transaction identifier with the transaction; code for identifying an issuer identifier from the account number; code for sending the authorization request message to an issuer using the issuer identifier; code for receiving an authorization response message from the issuer; code for sending the authorization response message and the unique transaction identifier to the merchant; and code for upon receiving an authorization response message comprising an approval of the transaction.

The server computer 44 may also comprise code for receiving, from a merchant, a preauthorization request message comprising an account number and an estimated transaction amount; code for associating a unique transaction identifier with the transaction; code for identifying an issuer identifier from the account number; code for sending the preauthorization request message to an issuer using the issuer identifier; code for receiving an authorization response message from the issuer; code for sending the authorization response message and the unique transaction identifier to the merchant; and code for receiving a transaction completion message from the merchant comprising the unique transaction identifier and a revised transaction amount.

The payment processing network 26 may comprise or use a payment processing network such as VisaNet™. The payment processing network 26 and any communication network that communicates with the payment processing network 26 may use any other suitable wired or wireless network, including the Internet. The payment processing network 26 may be adapted to process ordinary debit or credit card transactions.

Although the payment processing network 26 is illustrated as being operationally between an acquirer 24 and an issuer 28, it need not be in other embodiments of the invention. It may include any suitable combination of computer apparatuses which can facilitate the processing described in this application.

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The access device 34 may comprise a processor and a computer readable medium, wherein the computer readable medium comprises code for obtaining an account number associated with a consumer; code for sending an authorization request message comprising the account number and an amount for the transaction to a payment processing network; and code for receiving an authorization response message comprising a unique transaction identifier for the transaction.

For simplicity of illustration, one consumer 30, one portable consumer device 32, one merchant 22, one access device 34, one acquirer 24, and one issuer 28 are shown. However, it is understood that in embodiments of the invention, there can be multiple consumers, portable consumer devices, merchants, access devices, acquirers, issuers, as well as server computers, databases, accounts, etc.

II. Exemplary Methods

Figure 2:
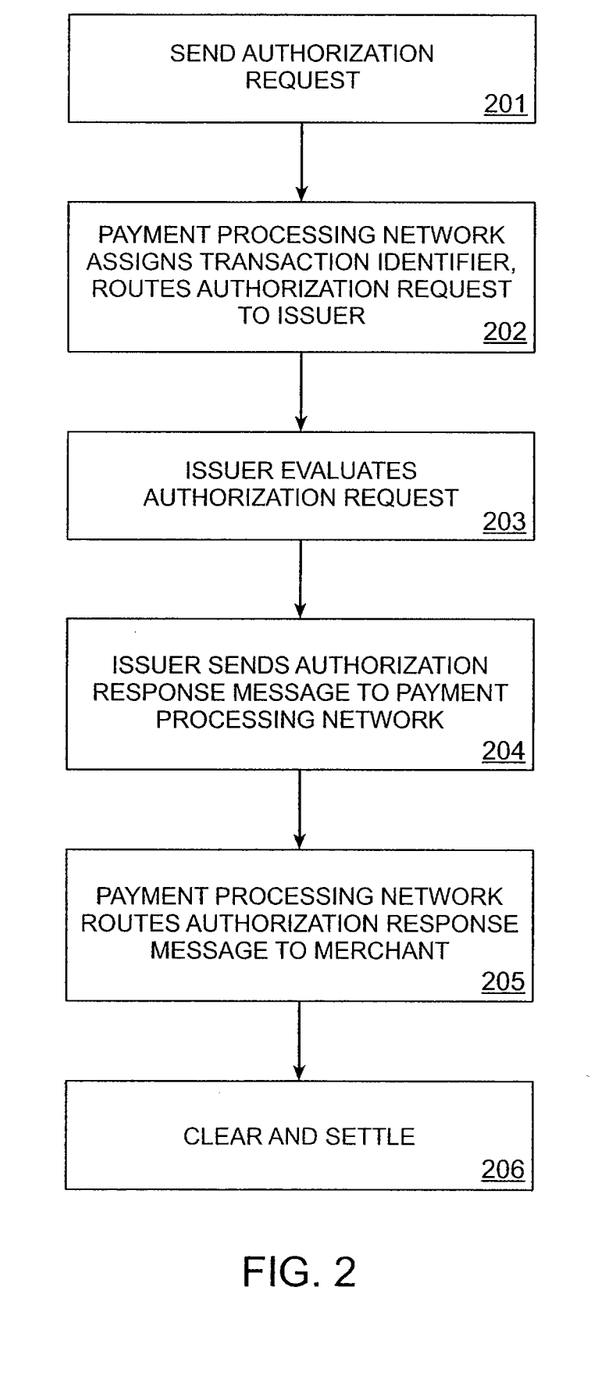
FIG. 2 is a flowchart illustrating a method according to an embodiment of the invention.

A method of performing an embodiment of the invention is detailed in FIG. 2. This embodiment shows the steps that can be taken for a payment transaction. In the embodiment of FIG. 2, the final monetary amount of the transaction is known at the start of the transaction. As described above, transactions in this embodiment can include purchasing goods and services online or at a retail store. For example, when buying a scarf at a department store, the final monetary amount (the price of the scarf plus any applicable tax and surcharges) is known at the start of the purchase.

In the method of FIG. 2, the consumer 30 from FIG. 1 purchases a good or service at the merchant 22 using a portable consumer device 32 such as a credit card. For example, the consumer 30 may take a credit card and may swipe it through an appropriate slot in the POS terminal. Alternatively, the POS terminal may be a contactless reader, and the portable consumer device 32 may be a contactless device such as a contactless card.

An authorization request message is then sent to the acquirer 24. The authorization request message can typically include the transaction amount, an account number associated with the portable consumer device 32, the date of the transaction, and any other necessary data. The authorization request message is then forwarded to the payment processing network 26 in step 201. Upon receiving the authorization request message, the payment processing network 26 determines the appropriate issuer 28 of the portable consumer device 32. In one implementation, this is done by analyzing the account number associated with the portable consumer device 32 to identify the issuer identifier. In some embodiments, the issuer identifier may include a BIN or bank identification number (in some cases a six digit number). The issuer identifier alerts the payment processing network 26 as to which issuer 28 is associated with the account used in the transaction, and allows the payment processing network 26 to route messages to the issuer 28. Once the issuer is determined, the payment processing network forwards the authorization request to the issuer in step 202.

The payment processing network 26 also assigns a unique transaction identifier to be associated with the transaction being performed. In one aspect, the unique transaction identifier comprises 15 digits and is completely unique to the associated transaction. Such a unique transaction identifier may not be re-used for another transaction for up to 10 years. In certain implementations, the unique transaction identifier can be created as a sequence number based upon a predetermined formula. In certain other aspects, the unique transaction number can be generated by a random number generation algorithm, by assigning the number from a list, or other suitable method. The unique transaction identifier may be associated to the transaction through a look up table, by means of sharing certain characteristics with a reference identifier such as the credit card account number used or the date of the transaction, by means of manipulating a reference identifier through mathematical or other formulas to create the unique transaction identifiers, or by other suitable means. In preferred embodiments, the unique transaction identifier may include a 15 digit number that is associated to the transaction through a look up table.

Once the issuer 28 receives the authorization request message, it evaluates it in step 203. In preferred embodiments, the issuer 28 can determine whether the transaction is authorized or not authorized. This can be based upon criteria evaluated by the issuer 28, such as amount of credit remaining in the account used by the consumer 30 for the transaction. After the issuer 28 has made a determination as to authorization of the transaction, it transmits an authorization response message, which can include an approval or a denial of the transaction, to the payment processing network 26 in step 204. The payment processing network 26 then, in step 205, forwards the authorization response message to the merchant 22 (in certain embodiments, through the acquirer), while adding the unique transaction identifier to the message. This provides the merchant the unique transaction identifier associated with the transaction, and removes the need for the merchant 22 to record the credit card or other account number used by the portable consumer device. Any future reference to this specific transaction can be made by citing the associated unique transaction identifier.

The merchant 22 receives the authorization response message, and if the transaction is authorized, the merchant 22 can proceed with the transaction. From the example cited above, the merchant 22 can at this point provide the purchased scarf to the consumer 30. Furthermore, after the transaction is authorized, the clearing and settlement step 206 can occur.

In the clearing and settlement occurring in step 206, financial details are exchanged between the acquirer 24 and the issuer 28 through the payment processing network 26 to facilitate posting to the consumer's account and reconciliation of the consumer's settlement position. Clearing is when a transaction is delivered from an acquirer to an issuer for posting to the consumer's account. Settlement is the process of calculating and determining the net financial position of each participant in the transaction that has cleared. The payment processing network may coordinate the clearing and settling through an SMS (single message system) or a BASE II system, among other systems.

Traditionally, transactions could be authorized, cleared and settled as either a dual message or a single message transaction. A dual message transaction is sent twice; the first time with only information needed for an authorization decision, and again later with additional information for clearing and settlement. In comparison, a single message transaction is sent once for authorization and contains clearing and settlement information as well. These transactions can be processed by SMS. Typically, authorization, clearing and settlement all occur on line. Certain issuers and acquirers may be capable of handling transactions that are either dual message or single message, while other issuers and acquirers may only be equipped to handle one kind or the other.

Preferred embodiments of the current invention utilize SMS messages. Using this system, the clearing and settlement step 206 can occur in substantially real time with the authorization in step 204. In preferred embodiments, clearing and settlement occurs within approximately 30 minutes from authorization. In this way, only a single message may be needed to be sent from the merchant 22 (as seen in step 201) to initiate the transfer of funds. After the clearing and settlement has occurred in this implementation, the payment processing network 26 has moved the funds required for the transaction from the consumer's account with the issuer 28 to an account associated with the merchant 22. In preferred embodiments, the account associated with the merchant is held by the acquirer.

In embodiments where an entity such as the acquirer 24 or the issuer 28 are not equipped to conduct transactions using SMS, the payment processing network 26 can convert any necessary messages to communicate over the required systems. In this way, a wide array of institutions may utilize embodiments of the invention.

Figure 3:
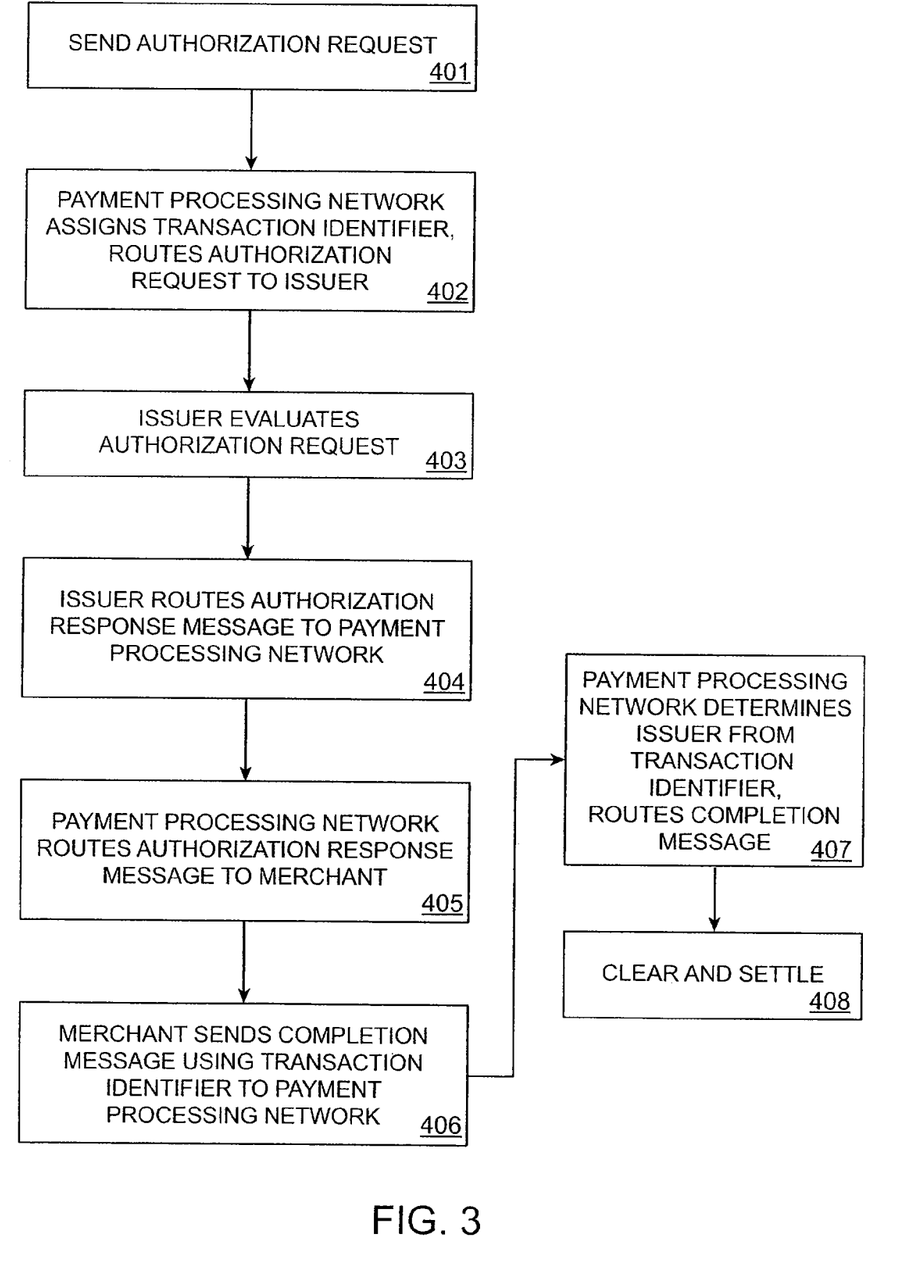
FIG. 3 is a flowchart illustrating a method according to a second embodiment of the invention.

A method of performing another embodiment of the invention is detailed in FIG. 3. In this embodiment, the transaction's final monetary amount is not known at the time of authorization. Such a transaction is a two step process, comprising authorization and then completion. For example, this embodiment may include the purchase of fuel at a gas station, any transaction in a tipping environment (such as at a restaurant or spa), a transaction at a hotel where the final rate including incidentals is not known until checkout, car rentals, cruise trips, electronic commerce, etc.

In the method of FIG. 3, much as in FIG. 2, the consumer 30 from FIG. 1 purchases a good or service from a merchant 22 using a portable consumer device 32 such as a credit card. However, in this transaction, the final amount is not known at this time.

A two part message can be used. A preauthorization request message is sent to the acquirer. The preauthorization request message may typically include an estimated transaction amount, an account number for the portable consumer device, the date of the transaction, and any other necessary data. In certain embodiments, the preauthorization request message can further include a time limit. This time limit ensures that if the transaction is authorized but completion never occurs, that no funds are taken from the consumer's account. Once the time limit has expired without completion occurring, the transaction is cancelled. This is in contrast with the one-step process of FIG. 2, where completion occurs in substantially real time with authorization and therefore no time limit is required. The preauthorization request message is then forwarded to the payment processing network in step 401. Upon receiving the preauthorization request message, the payment processing network 26 determines the appropriate issuer 28 of the portable consumer device 32. In one implementation, this is done by analyzing the account number for the portable consumer device to identify the issuer identifier. The issuer identifier alerts the payment processing network 26 as to which issuer 28 is associated with the account used in the transaction, and allows the payment processing network 26 to route messages to the issuer 28. Once the issuer 28 is determined, the payment processing network 26 associates a unique transaction identifier with the transaction as in FIG. 2, and forwards the preauthorization request to the issuer 28 in step 402.

The issuer 28 can then evaluate the request in step 403. In preferred embodiments, the issuer 28 can determine whether the transaction is authorized or not authorized. This can be based upon criteria evaluated by the issuer 28, such as amount of credit remaining in the account used by the consumer 30 for the transaction. In certain embodiments, an estimated transaction amount can be provided in the request. For example, in a hotel stay, the estimated transaction amount may include both the estimated room rate, and a calculated extra amount to cover for mini bar usage and the like. In other embodiments, no transaction amount is provided, and the issuer 28 can determine authorization based on the transaction type. For example, if the transaction is for a fuel purchase, the issuer 28 may require $100 of credit remaining in the consumer's account.

After the issuer 28 has made a determination as to authorization of the transaction, it transmits an authorization response message, which can include an approval or a denial of the transaction, to the payment processing network 26 in step 404. The payment processing network 26 then, in step 405, forwards the authorization response message to the merchant 22 (in certain embodiments, through the acquirer 24), while adding the unique transaction identifier to the message. This provides the merchant with the unique transaction identifier associated with the transaction, and removes the need for the merchant to record the credit card or other account number used by the portable consumer device.

The merchant 22 receives the authorization response message, and if the transaction is authorized, can proceed with the transaction. For example, for a car rental transaction, the consumer 30 can begin the car rental period. Once the rental period is over, the consumer may bring the car back to the rental merchant, and the merchant can calculate the revised transaction amount. This should be the final amount for the transaction. In the example just cited, the merchant may add on the cost of any fuel used by the consumer to the rental total, or revise the price to reflect the actual number of days the car was rented. Once the revised transaction amount is calculated, the merchant can send a transaction completion message to the payment processing network in step 406 (in certain embodiments, by way of the acquirer). In preferred embodiments, this message does not contain the account number (such as a credit card number) of the portable consumer device used by the consumer. To refer to the transaction, the merchant can include the unique transaction identifier that was provided. This, along with the revised transaction amount, can be sent to the payment processing network. In this embodiment, the merchant does not need to retain or even see the consumers account number for the second step, and further, the account number is not transmitted to the acquirer or payment processing network.

In step 407, the payment processing network determines the issuer for the transaction using the unique transaction identifier. The method of determination can depend on the method used to create the identifier. As described above, if the identifier is assigned from a random number generated and associated to the transaction by a look up table, reference to the look up table may suffice. In other embodiments, the transaction can be determined from the unique transaction identifier by any shared characteristics a reference number has with the identifier, by reverse mathematical manipulation of the identifier, or other suitable means.

Once the payment processing network 26 determines the appropriate issuer 28, it routes the completion message, in step 407. Once the transaction has completed, the clearing and settlement step 408 occurs. Clearing and settlement occurs in a substantially similar fashion as in the embodiment of FIG. 2. In this embodiment, the clear and settle step 408 is able to be processed in substantially real time with the completion in step 406. In preferred embodiments, this entails that clearing and settlement is processed using SMS and occurs within approximately 30 minutes from the completion occurring. In this embodiment, two messages may be needed to be sent from the merchant (as seen in steps 401 and 406) to effect funds transfer. After the clearing and settlement has occurred in this implementation, the payment processing network has moved the appropriate funds required for the transaction from the consumer's account with the issuer to an account associated with the merchant. In preferred embodiments, the account associated with the merchant is held by the acquirer associated with the merchant.

In embodiments where an entity such as the acquirer or the issuer are not equipped to conduct transactions using SMS, the payment processing network can convert any necessary messages to communicate over the required systems. In this way, a wide array of institutions may take advantage of the current invention.

Figure 4:
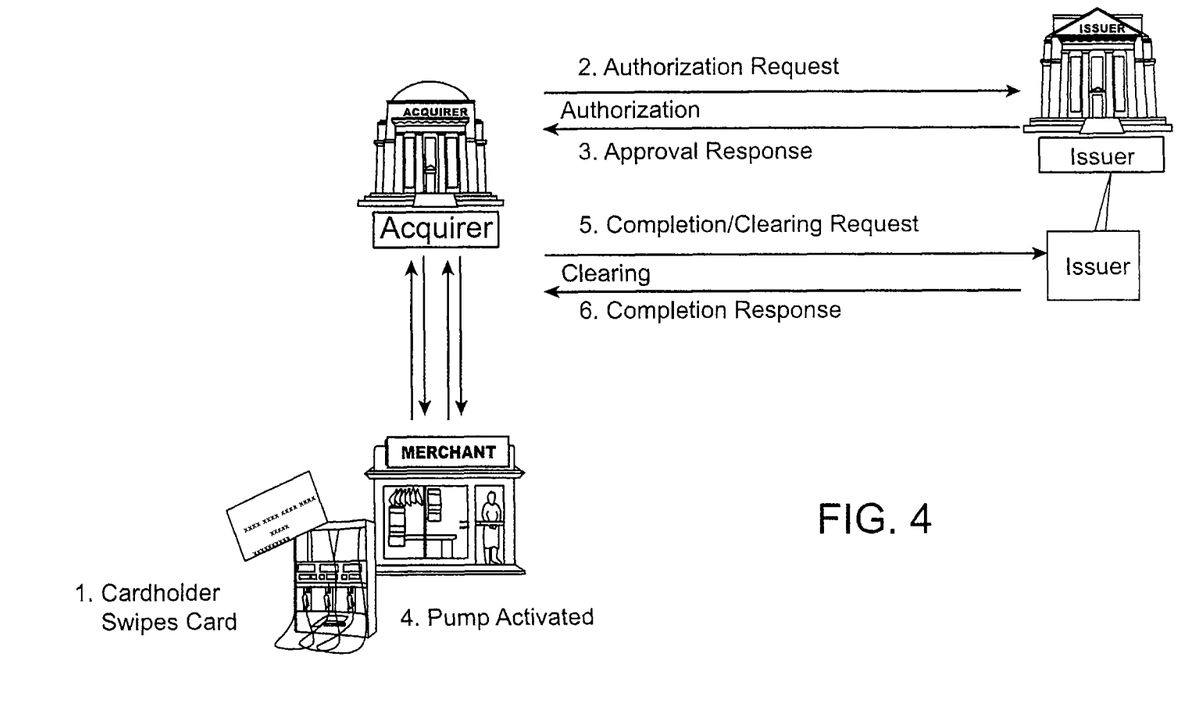
FIG. 4 is a flowchart illustrating a method of purchasing fuel according to an embodiment of the invention.

FIG. 4 shows a method of performing another embodiment of the invention. This embodiment shows the steps taken for a payment transaction at a gas station. In such a payment transaction, similar to the transaction of FIG. 3, the final monetary amount is not known until all of the fuel has been dispensed. In step 1, the consumer transmits information from a portable consumer device (such as a credit card) to the merchant. In step 2, the merchant transmits a preauthorization request to the acquirer, which forwards the request to the issuer associated with the portable consumer device. In preferred embodiments, the acquirer forwards the request to the issuer using a payment processing network. In step 3, the issuer sends an authorization message to the merchant. The merchant can also receive a unique transaction identifier for the transaction. Once authorized, the gas pump at the merchant is activated in step 4, and the consumer can fill her automobile with fuel. After the automobile is filled with the requisite amount of fuel, the merchant can send a completion message, which may include the final transaction amount and the unique transaction identifier, to the issuer in step 5. The payment processing network can then coordinate clearing and settlement in substantially real time. This can include moving the funds as appropriate in step 6, such that the merchant is paid for the fuel dispensed.

For embodiments of the invention, a unique transaction identifier is used to refer to the transaction. This identifier can be used for later processes that are associated with the transaction. In some instances, a consumer may request a refund for a transaction or a portion of a transaction. For example, this can be when a product was mistakenly charged to the account, such as having it charged twice during the purchase. If the original transaction was processed according to an embodiment of the invention, the consumer can contact the issuer, which forwards a chargeback request to the payment processing network. This request can contain the unique transaction identifier. The payment processing network can store a record of all transactions, and in these records associate the account numbers used with the unique transaction identifiers. In this way, the payment processing network can use the unique transaction identifier to determine which merchant was involved with the transaction, and can clear and settle the chargeback request. This comprises moving the funds related to the chargeback request from the merchant to the issuer. In doing so, the merchant does not need to see the account number, only the unique transaction identifier.

Embodiments of the invention have a number of advantages. For example, the account number of the consumer is less exposed to theft. Each time an account number is transmitted, it is vulnerable. Removing the account number from any communication stream is therefore beneficial. In specific embodiments, the only time the account number is transmitted is during the first request message. All further communications can be performed by referencing the unique transaction identifier instead of the account number. Furthermore, the merchant does not need to keep a record of the account number after sending the request message. This allows the merchant to purge all records of the account number used in the transaction, once the authorization response message is received. Actions taken later with respect to the transaction, such as clearing and settlement, reversals, other exception items such as chargebacks and re-presentments, etc., may only need to refer to the transaction identifier. This prevents the security risks inherent in transaction systems that require the merchant to store records of the account number for later processing.

Embodiments of the invention improve the speed of payment transactions. Typical transactions are processed in batch using a Base II system, and may take place over several days (i.e., clearing and settlement may occur days after authorization). In a novel aspect of this invention, processing of a payment transaction can occur in substantially real time, such as by using SMS. This further lessens the time transaction information needs to be stored, and therefore further lessens the possibility for data theft.

III. Portable Consumer Devices and Computer Apparatuses

Figure 5A:
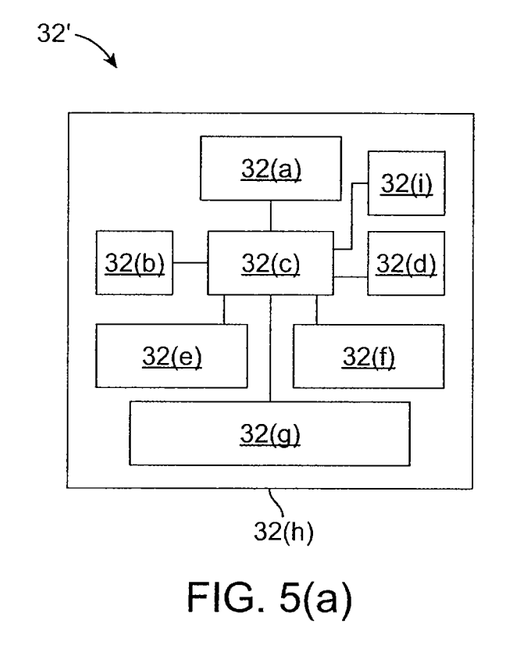
Figure 5B:
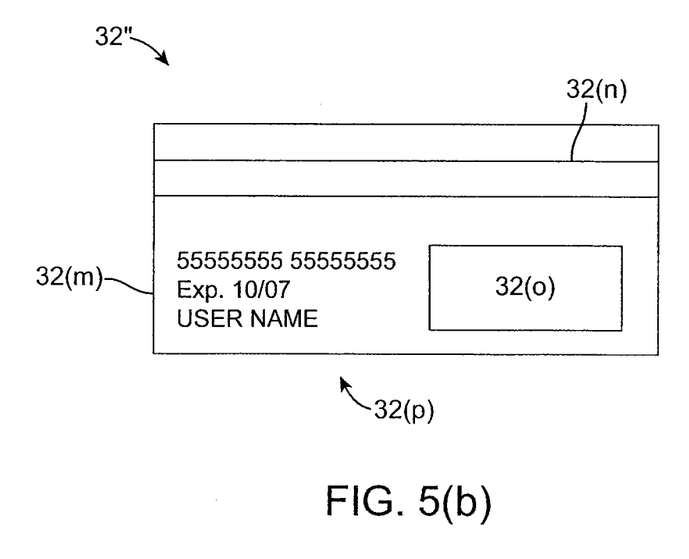
Figure 6:
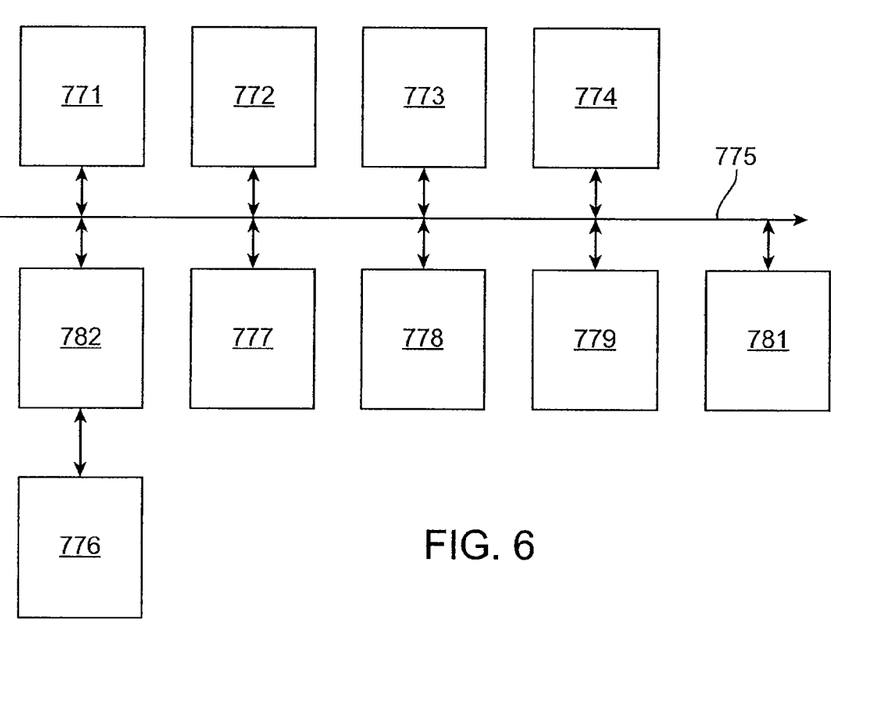
FIG. 6 shows a block diagram of a computer apparatus.

FIGS. 5-6 shows block diagrams of portable computer devices and subsystems that may be present in computer apparatuses in systems according to embodiments of the invention.

The portable consumer device that is used in embodiments of the invention may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a phone may comprise a computer readable medium and a body as shown in FIG. 5(a). (FIG. 5(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 32" in the form of a card is shown in FIG. 5(b). FIG. 5(b) shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 5(b), the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

The various participants and elements in FIG. 1 may operate or use one or more computer apparatuses to facilitate the functions described herein. Any of the elements in FIG. 1 (e.g., the access device 34, the merchant 22, the acquirer 24, etc.) may use any suitable number of subsystems to facilitate the functions described herein. Examples of such subsystems or components are shown in FIG. 6. The subsystems shown in FIG. 6 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method for processing a transaction, comprising:
   receiving, by a server computer, an authorization request message comprising an account number from an access device at a merchant;
   identifying, by the server computer, an issuer identifier from the account number;
   sending, by the server computer, the authorization request message to an issuer computer using the issuer identifier;
   associating, by the server computer, a unique transaction identifier with the transaction through a lookup table comprising a reference identifier, wherein the reference identifier is associated with the unique transaction identifier in the lookup table;
   receiving, by the server computer, an authorization response message comprising the account number from the issuer computer after the issuer computer authorizes the transaction;
   adding, by the server computer, the unique transaction identifier to the authorization response message and removing the account number from the authorization response message; and
   sending, by the server computer, the authorization response message including the unique transaction identifier to the access device at the merchant to complete authorization of the transaction, wherein the merchant stores the unique transaction identifier instead of the account number.

2. The method of claim 1 wherein the issuer identifier is a BIN number.

3. The method of claim 1 wherein the reference identifier is the account number.

4. The method of claim 1, further comprising:
   receiving, by the server computer, a chargeback request relating to the transaction from the issuer computer, wherein the chargeback request comprises the unique transaction identifier;
   determining, by the server computer, the account number from the unique transaction identifier; and
   clearing, by the server computer, the chargeback request.

5. The method of claim 1, wherein the unique transaction identifier comprises 15 digits.

6. The method of claim 1, further comprising:
   clearing the transaction in less than thirty minutes.

7. The method of claim 1, further comprising:
   moving funds for the transaction between the issuer computer and an acquirer computer.

8. The method of claim 1, wherein the reference identifier comprises the account number or the date of the transaction.

9. The method of claim 1, wherein the reference identifier was manipulated from the account number using a mathematical formula.

10. The method of claim 1, wherein the unique transaction identifier cannot be re-used for another transaction for up to ten years.

11. The method of claim 1 wherein the server computer is in a payment processing network that is adapted by process credit and debit card transactions.

12. The method of claim 1 wherein the unique transaction identifier is derived from the account number.

13. The method of claim 1 wherein the unique transaction identifier is derived from a date of the transaction.

14. The method of claim 1 wherein the authorization request message further comprises a transaction amount.

15. The method of claim 14 further comprising:
   receiving, by the access device, the account number from a portable consumer device.

16. The method of claim 15 wherein the portable consumer device comprises an RF antenna.

17. The method of claim 1 wherein the merchant is an online merchant.

18. A server computer comprising a processor and a non-transitory computer readable medium comprising program code executable by the processor to implement a method comprising:
   receiving an authorization request message comprising an account number from an access device at a merchant for a transaction;
   identifying an issuer identifier from the account number;
   sending the authorization request message to an issuer computer using the issuer identifier;
   associating a unique transaction identifier with the transaction through a lookup table comprising a reference identifier, wherein the reference identifier is associated with the unique transaction identifier in the lookup table;
   receiving an authorization response message comprising the account number from the issuer computer after the issuer computer authorizes the transaction;
   adding the unique transaction identifier to the authorization response message and removing the account number from the authorization response message; and
   sending the authorization response message including the unique transaction identifier to the access device at the merchant to complete authorization of the transaction, wherein the merchant stores the unique transaction identifier instead of the account number.

19. The server computer of claim 18, wherein the method further comprises:
   receiving a chargeback request relating to the transaction from the issuer computer, wherein the chargeback request comprises the unique transaction identifier;
   determining the account number from the unique transaction identifier; and
   clearing the chargeback request.

20. The server computer of claim 18, wherein said method comprises clearing the transaction in less than thirty minutes.

21. The server computer of claim 18, wherein the authorization response message including the unique transaction identifier is sent to an acquirer before the authorization response message is received by the access device.

22. The server computer of claim 18, wherein the issuer identifier is a BIN number.

* * * * *